United States Patent
Tsai

[19]

[11] Patent Number: 6,049,433
[45] Date of Patent: Apr. 11, 2000

[54] DEVICE FOR EQUALIZING LIGHT STRENGTH OF LIGHT SOURCE

[75] Inventor: Jenn-Tsair Tsai, Taipei Hsien, Taiwan

[73] Assignee: Mustek Systems Inc., Hsinchu, Taiwan

[21] Appl. No.: 09/163,786

[22] Filed: Sep. 30, 1998

[30] Foreign Application Priority Data

Sep. 30, 1997 [TW] Taiwan ................................ 86216591

[51] Int. Cl.$^7$ .............................. G02B 3/10; G02B 13/08; G03B 15/02; G03B 27/72
[52] U.S. Cl. ............................ 359/721; 359/668; 362/16; 355/35; 355/67
[58] Field of Search ..................... 359/721, 668, 359/708, 710, 712, 720, 724, 737, 798, 799, 809; 362/16, 509, 516, 520–521; 355/35, 67–68, 84

[56] References Cited

U.S. PATENT DOCUMENTS

| | | | |
|---|---|---|---|
| 3,807,856 | 4/1974 | Rodriguez | 355/67 |
| 4,445,774 | 5/1984 | Spinelli et al. | 355/71 |
| 4,460,939 | 7/1984 | Murakami et al. | 362/31 |
| 5,523,562 | 6/1996 | Maple | 250/235 |
| 5,671,084 | 9/1997 | Kurtz | 359/362 |

*Primary Examiner*—Scott J. Sugarman
*Assistant Examiner*—David N. Spector
*Attorney, Agent, or Firm*—Alston & Bird LLP

[57] ABSTRACT

A light strength equalizing device for a light source is provided. The device includes an illuminated area, a light source emitting a light for illuminating along a light path the illuminated area with different light strengths, and a compensating device mounted in the light path for respectively compensating the different light strengths in order to equalize the different light strengths on the illuminated area.

18 Claims, 9 Drawing Sheets

019
DEVICE FOR EQUALIZING LIGHT STRENGTH OF LIGHT SOURCE

FIELD OF THE INVENTION

The present invention relates to a device for adjusting a light source, and more particularly to a device for adjusting a light strength of a light source.

BACKGROUND OF THE INVENTION

Figure 1:
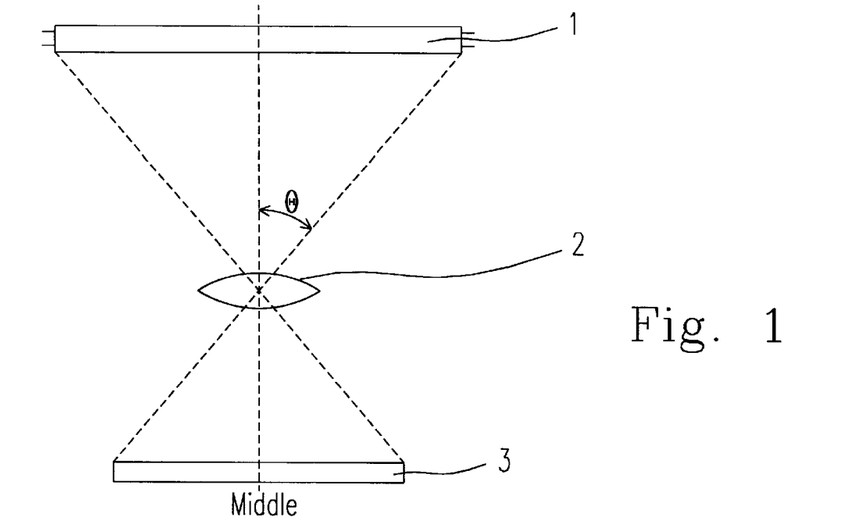
FIG. 1 is a schematical view showing the relationship among the light source, the lens and the photoelectric converting module.

As shown in FIG. 1, the light emitted from the lamp tube 1 is to be focussed by the lens 2 and then transmitted to the photoelectric converting module 3 for converting the optical signal of the focussed image into the electronic signal. Since the emitted light, through lens 2, has an incident angle θ upon photoelectric module 13, the optical strength must be operated with a factor of $\cos^4 \theta$ so that the light strength received at two ends of photoelectric converting module 13 will be weaker than that at the intermediate portion of photoelectric converting module 13. The situation that photoelectric converting module 13 receives an unequal light strength will be made worse owing to the fact that tube 1 has originally an intermediate portion having a light strength larger than that at two ends thereof.

Figure 2:
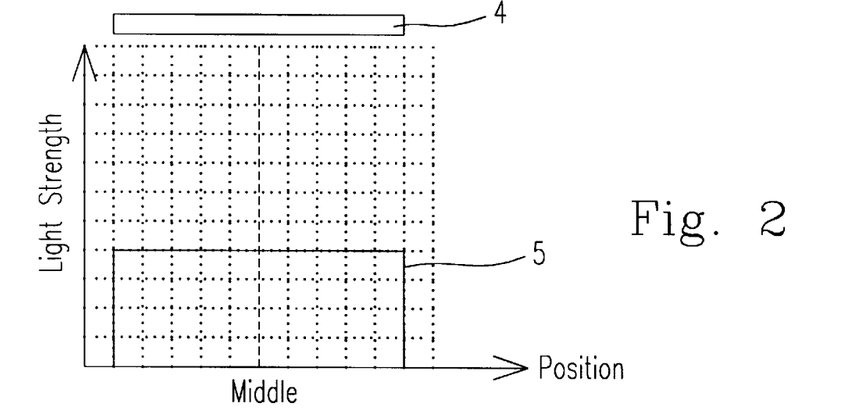
FIG. 2 is a schematical view showing an ideal pixel output of a photoelectric converting module.
Figure 3:
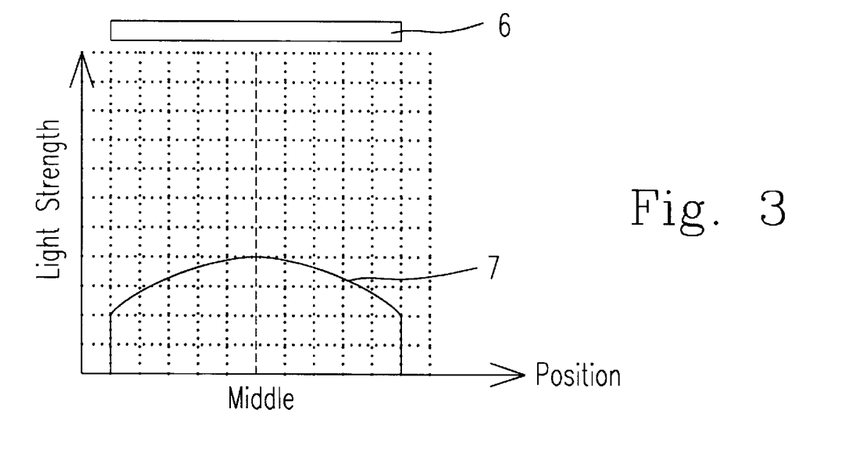
FIG. 3 is a schematical view showing an exemplary pixel output of a photoelectric converting module according to the prior art.

As shown in FIG. 2, ideally, if a photoelectric converting module 4 receives an equal light strength, the pixel output will present a straight line 5. Through the $\cos^4 \theta$ factor and the intermediate portion of the lamp tube having a stronger light strength, as shown in FIG. 3, the saturation (or resolution or light strength) in the middle portion of the photoelectric converting module 6 corresponding to the intermediate portion of the lamp tube will be about 50% higher (stronger) than that at two ends of photoelectric converting module 6 to present a convex pixel output line 7.

Figure 4:
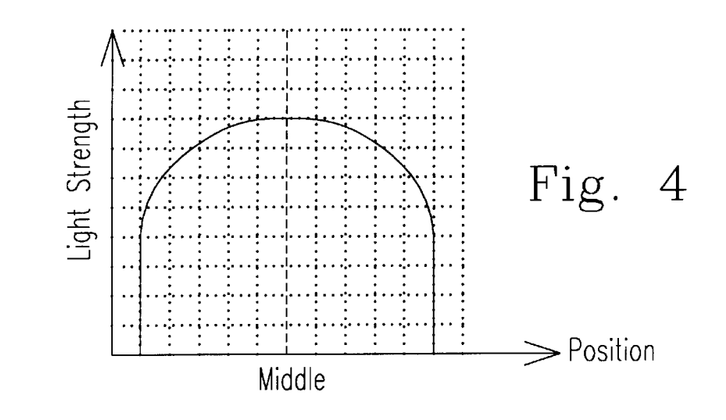
FIG. 4 is a schematical view showing a pixel output of a photoelectric converting module where the light source is provided with a reflection piece.
Figure 5:
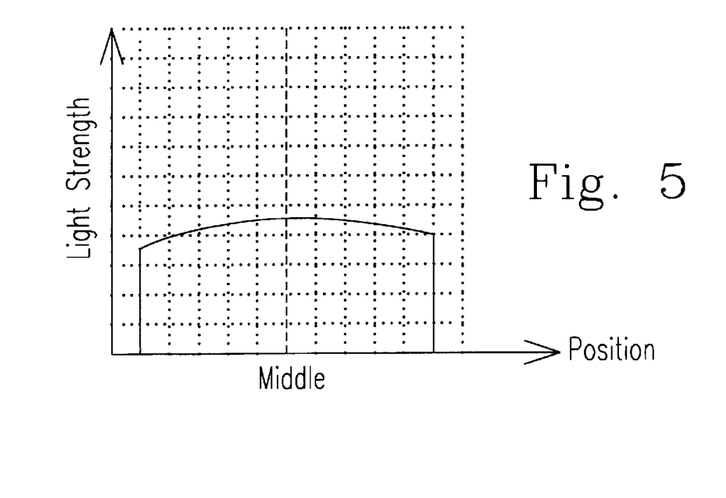
FIG. 5 is a schematical view showing a pixel output of a photoelectric converting module where the light source is provided with an ideal reflection piece.

In order to overcome the above situation, several solutions are proposed. As shown in FIG. 4, a reflection piece is normally used to enhance the output of the photoelectric converting module. In order to equalize the light strength received by the photoelectric converting module as shown in FIG. 5, different reflection pieces are required around the intermediate portion and two ends of the lamp tube. Since the different reflection pieces must be arranged around the lamp tube in a precise location and a proper orientation, they cannot be easily mounted in position accurately.

Figure 6:
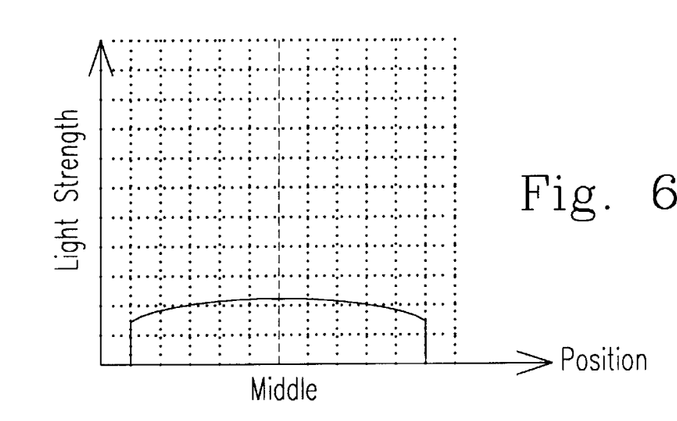
FIG. 6 is a schematical view showing a pixel output of a photoelectric converting module where a mask or a lamp is used to equalize the light strength of a light source.

As shown in FIG. 6, if we attempt to use a mask or a lamp cover for evening the light strength or lowering the light strength from the intermediate portion of the lamp tube, the light strength at two ends of the lamp tube will also be reduced.

Figure 7:
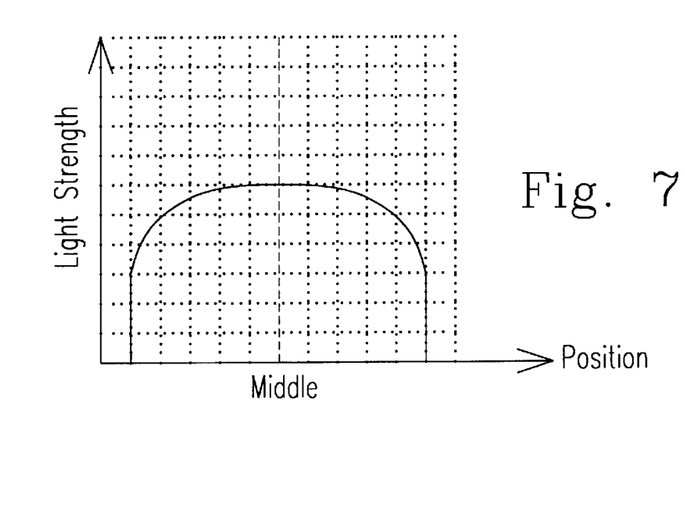
FIG. 7 is a schematical view showing a pixel output of a photoelectric converting module where the lamp current is increased to enhance the lightness of the light source.

As shown in FIG. 7, if we try to increase the lightness of the lamp tube by raising the lamp current, the lamp life will be shortened, more energy will be consumed, and there will come the problem that the vaporized mercury will reach a critical state which will intermittently spark which means we have an unstable light source.

Figure 8:
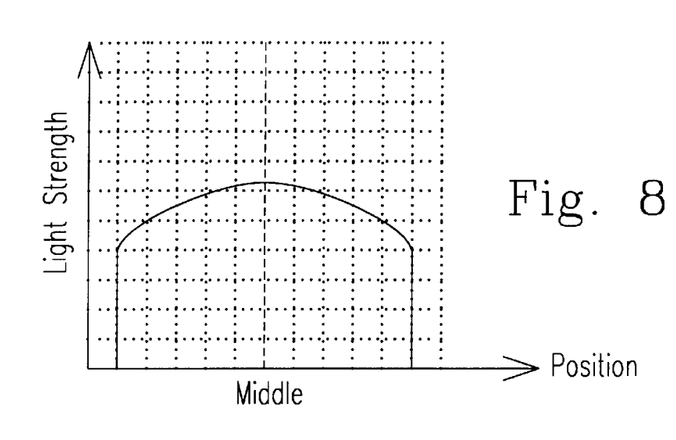
FIG. 8 is a schematical view showing a pixel output of a photoelectric converting module where a flat column lens is used to enhance the light strength of the light source.

In some hand-held scanner, the flat column lens is used which can increase the lightness but no lightness-equalizing effect is available as shown in FIG. 8.

Figure 9:
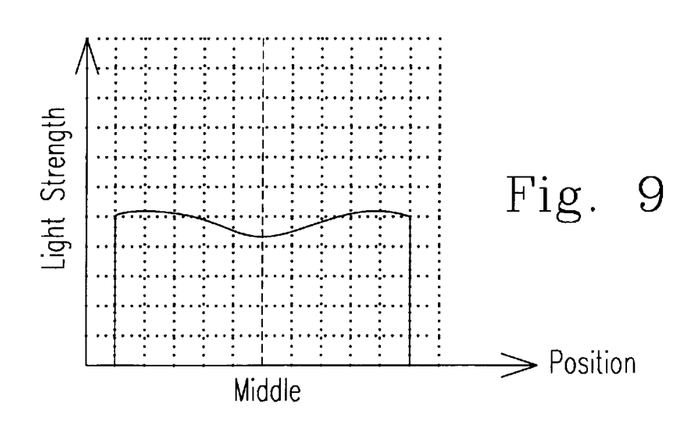
FIG. 9 is a schematical view showing a pixel output of a photoelectric converting module where an L- or U-type lamp tube is used.

If an L- or U-lamp tube is used for reinforcing the lightness in two ends of the lamp tube for trying to equalize the received light strength, the light strength output line still is not straight as desired as can be seen in FIG. 9.

It is therefore tried by the Applicant to deal with the above situation encountered in the prior art.

SUMMARY OF THE INVENTION

It is therefore an object of the present invention to provide a device for equalizing the light strength for a light source.

It is further an object of the present invention to provide a device for enhancing the lightness of a light source.

According to another aspect of the present invention, a device for equalizing a light strength of a light source includes an illuminated area, a light source emitting a light for illuminating along a light path the illuminated area with different light strengths, and a compensating device mounted in the light path for respectively compensating the different light strengths in order to equalize the different light strengths on the illuminated area.

Preferably the compensating device is a focussing device. The focussing device can be a column lens having different curvatures in different crosssections in which the focussing device is elongate and has two ends and an intermediate portion in which the curvature in the two ends is larger or smaller than that in the intermediate portion.

Alternatively the focussing device can be a column lens having substantially the same curvature in different crosssections where the focussing device is elongate and has two ends and an intermediate portion in which the distance between either of the ends and the illuminated area is larger or smaller than the distance between the intermediate portion and the illuminated area.

Preferably the light source is an elongate lamp. There further is a lamp cover positioned at a first side of the lamp for directing the light toward a second opposite side of the lamp for enhancing the light strengths.

Preferably the lamp cover is provided with an inner reflection piece for reinforcing the light strengths.

Preferably the lamp cover has a crosssection being one of a ¾ circle and a parabola.

According to further an aspect of the present invention, a scanner incorporating therein a device for equalizing a light strength of a light source includes an illuminated area, a light source emitting a light for illuminating along a light path the illuminated area with different light strengths, a compensating device mounted in the light path for respectively compensating the different light strengths in order to equalize the different light strengths on the illuminated area, and a scanned object disposed on the illuminated area to be scanned by the scanner.

Preferably the compensating device is a focussing device and the light source is an elongate lamp.

Certainly, the focussing device can be a column lens having different curvatures in different crosssections, or a column lens having substantially the same curvature in different crosssections.

According to additional an aspect of the present invention, a device for enhancing a light strength of a light source includes an illuminated area, a light source emitting a light for illuminating along a light path the illuminated area with a light strength, and a light cover positioned at a first side of the light source for directing the light toward a second opposite side of the light source for enhancing the light strength, in which the improvement resides in that the light cover has a crosssection being one of a ¾ circle and a parabola.

Certainly such device can further include a compensating device mounted in the light path for compensating the light strength in order to equalize the light strength on the illuminated area.

Certainly the light strength can be different all over the illuminated area. The light cover can be provided with an inner reflection piece for reinforcing the light strength. The light source can be an elongate lamp. The present invention may best be understood through the following descriptions with reference to the accompanying drawings, in which:

DETAILED DESCRIPTION OF THE PREFERRED EMBODIMENT

A method for equalizing a light strength of a light source according to the present invention includes the steps of:
a) providing an illuminated area;
b) providing a light source emitting a light for illuminating the illuminated area with different light strengths; and
c) providing a compensating device to be mounted between the light source and the illuminated area for respectively compensating the different light strengths in order to equalize the different light strengths on the illuminated area.

Figure 10:
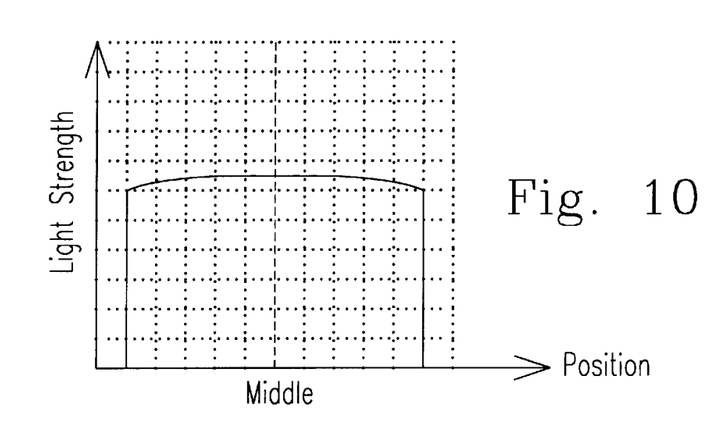
FIG. 10 is a schematical view showing a pixel output of a photoelectric converting module according to the present invention.
Figure 11:
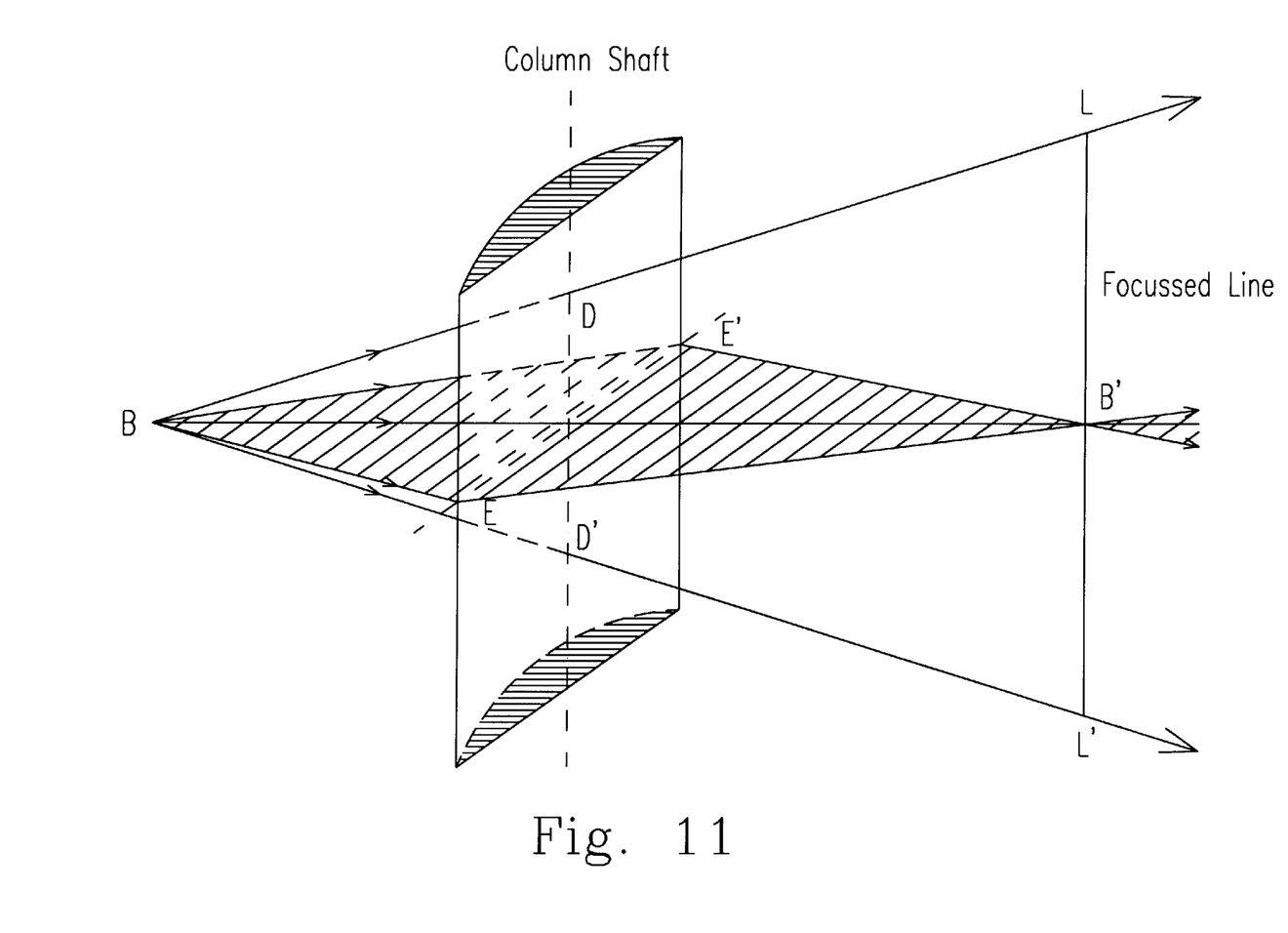
FIG. 11 is a schematical view showing the operation of a column lens.

Generally the compensating device is a focussing device which has a focussing distance larger or smaller than a distance between said focussing device and said illuminated area. FIG. 10 is a schematical view showing a pixel output of a photoelectric converting module according to a device for equalizing the light strength of the light source of the present invention. FIG. 11 is a schematical view showing the operation of a column lens.

Figure 12:
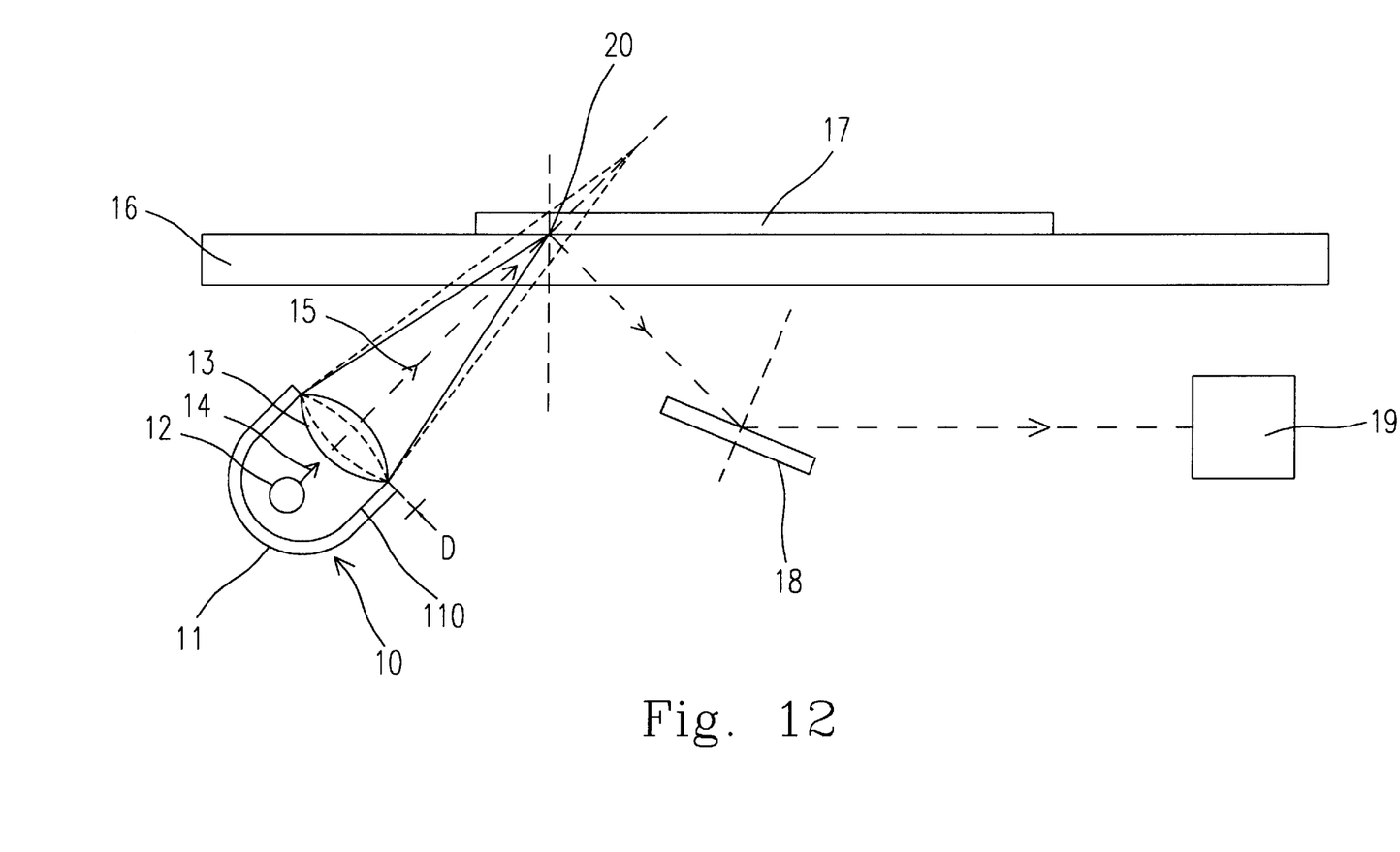
FIG. 12 is a schematical view showing a scanner incorporating therein a device for equalizing the light strength of the light source according to the present invention.

Referring now to FIG. 12, there is schematically shown a scanner incorporating therein a device for equalizing the light strength of the light source according to the present invention. The image can be read into the computer memory, digitized to be shown on the display or printed out. The scanner includes an illuminated area 20, a light source device 10 for emitting a light 14 for illuminating along a light path 15 the illuminated area 20 with different light strengths, a compensating device 13 mounted in light path 15 for respectively compensating the different light strengths in order to equalize the different light strengths on the illuminated area, and a scanned object 17 disposed on a transparent platform 16 or on illuminated area 20 to be scanned. Scanned object 17 will reflect light 14. The reflected light will be again reflected from a reflection mirror 18 which is synchronously movable with light source device 10 to an optical receiving end 19 which can be a charge-coupled device for conversion into different current pulses according to different light strengths to be transmitted to an analog/digital converter for process by the computer. Generally speaking, compensating device 13 is a focussing device being a column lens having different curvatures or alternatively substantially the same curvature in different crosssections.

According to the present invention, the light source device 10 includes a light source 12, being an elongate lamp tube in this embodiment to have an intermediate portion having a light strength stronger than that at two ends thereof, emitting a light for illuminating along a light path an illuminated area with a light strength, and a light cover 11 positioned at a first side of light source 12 for directing the light toward a second opposite side of light source 12 for enhancing the light strength, in which the improvement resides in that the light cover 11 has a crosssection being one of a ¾ circle and a parabola. Light source 12 might alternatively be a surface source and the light strength may be different all over the illuminated area. In addition, an inner reflection piece 110 could be provided with light cover 11 for reinforcing the light strength.

Figure 13A:
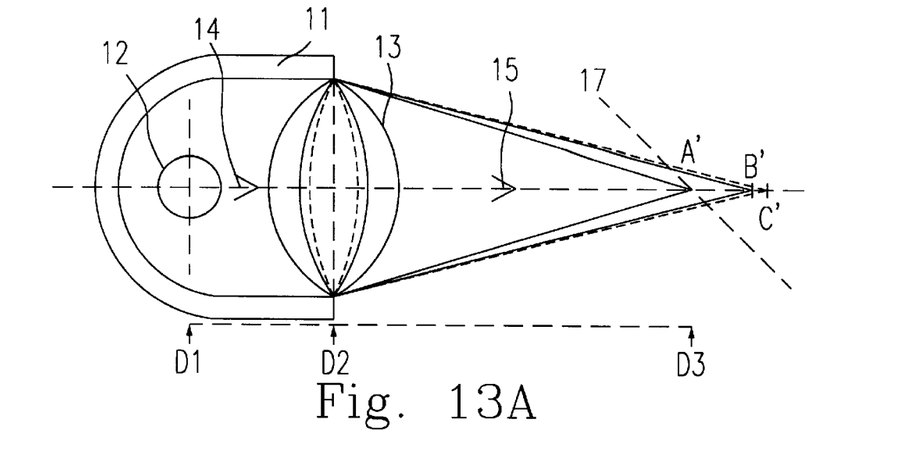
FIG. 13A is a schematical end view showing a first preferred embodiment of a device for equalizing the light strength of the light source according to the present invention.
Figure 13B:
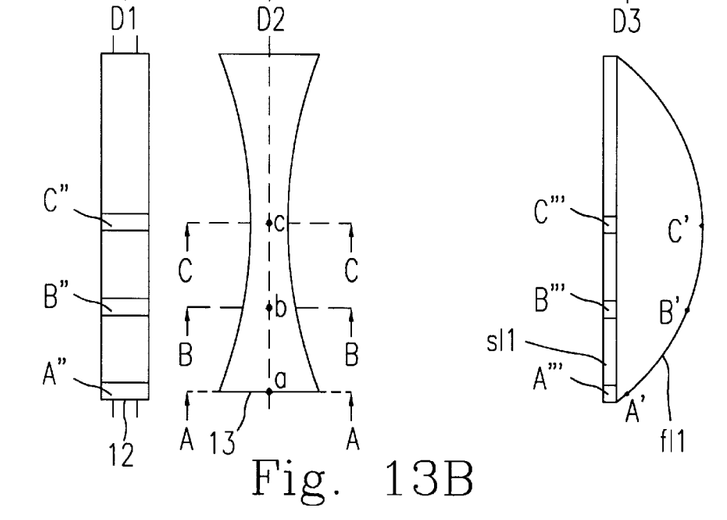
FIG. 13B is a schematical side view showing a device in FIG. 13A.
Figure 13C:
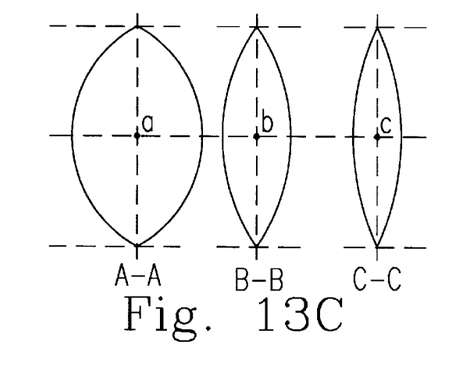
FIG. 13C is a schematical view showing 3 crosssections of a compensating device in an equalizing device in FIG. 13A.

Referring now to FIGS. 13A~13C, there is schematically shown an end view showing a first preferred embodiment of a device for equalizing the light strength of the light source 12 according to the present invention, in which FIG. 13B is a schematical side view showing a device in FIG. 13A from the direction shown by arrows D1, D2 and D3, and FIG. 13C is a schematical view showing 3 crosssections of a compensating device 13 in an equalizing device in FIG. 13A respectively from lines A—A, B—B and C—C. The device in this embodiment includes a light cover 11, a light source 12, a compensating device 13 mounted in the light path 15 and being a column lens having a focus line fl1 and a scanned object 17 having scanned line sl1.

Lamp tube 12 emits from different positions A", B", C" thereof a light 14 having different light strengths. Column lens 13 has in different corresponding crosssections a, b, c different focussing distances (or foci A', B', C'). Foci A', B', C' can be connected to form focus line fl1. Scanned line sl1 has points A'", B'", C'" respectively corresponding to different positions A", B", C" or foci A', B', C'. As can be clearly seen from FIG. 13B, point A'" is closer to the focus (A') than points B'" or C'" so that point A'" will be illuminated stronger than points B'" or C'" to compensate the weaker light strength from position A". By the same token, point C'" is farther to the focus (C') than points B'" or A'" so that point C'" will be illuminated stronger than points B'" or A'" to compensate the stronger light strength from position C". Accordingly, the different light strengths are respectively properly compensated to obtain a pixel output for the photoelectric converting module as shown in FIG. 10. In this embodiment, column lens 13 has different curvatures in different crosssections (a, b, c) and the curvature in two ends thereof (a) is larger than that in the intermediate portion thereof (c). In addition, focus line fl1 is positioned at the outer side of scanned line sl1.

Figure 14A:
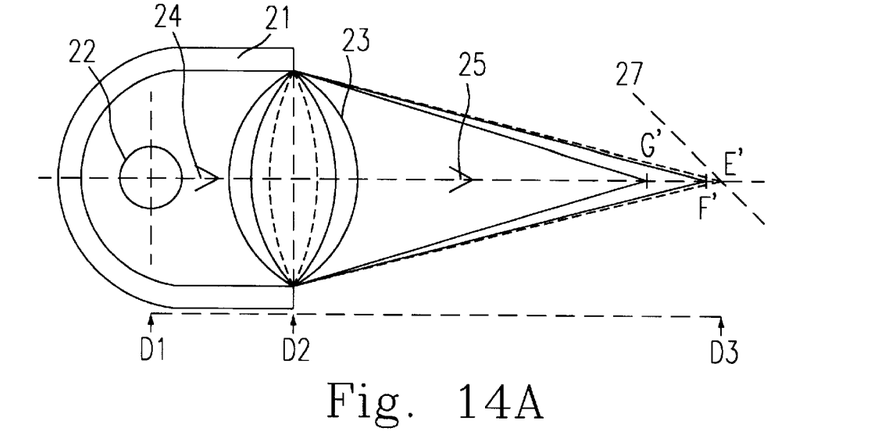
FIG. 14A is a schematical end view showing a second preferred embodiment of a device for equalizing the light strength of the light source according to the present invention.
Figure 14B:
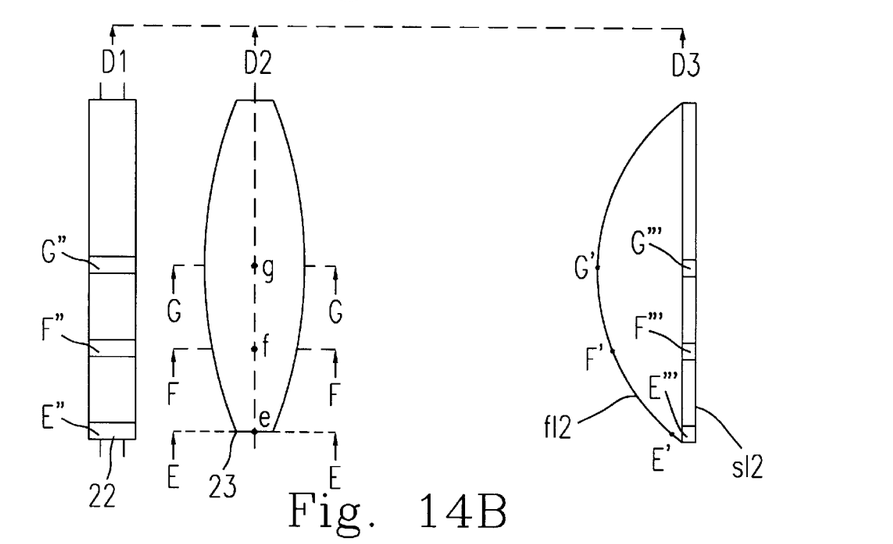
FIG. 14B is a schematical side view showing a device in FIG. 14A.
Figure 14C:
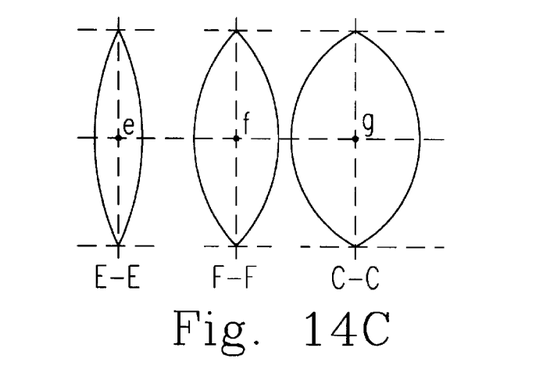
FIG. 14C is a schematical view showing 3 crosssections of a compensating device in an equalizing device in FIG. 14A.

Referring now to FIGS. 14A~14C, there is schematically shown an end view showing a second preferred embodiment of a device for equalizing the light strength of the light source 22 according to the present invention, in which FIG. 14B is a schematical side view showing a device in FIG. 14A from the direction shown by arrows D1, D2 and D3, and FIG. 14C is a schematical view showing 3 crosssections of a compensating device 23 in an equalizing device in FIG. 14A respectively from lines E—E, F—F and G—G. The device in this embodiment includes a light cover 21, a light source 22, a compensating device 23 mounted in the light path 25 and being a column lens having a focus line fl2 and a scanned object 27 having scanned line sl2.

Lamp tube 22 emits from different positions E", F", G" thereof a light 24 having different light strengths. Column lens 23 has in different corresponding crosssections e, f, g different focussing distances (or foci E', F', G'). Foci E', F', G' can be connected to form focus line fl2. Scanned line sl2 has points E'", F'", G'" respectively corresponding to different positions E", F", G" or foci E', F', G'. As can be clearly seen from FIG. 14B, point E'" is closer to the focus (E') than points F'" or G'" so that point E'" will be illuminated stronger than points F'" or G'" to compensate the weaker light strength from position E". By the same token, point G'" is farther to the focus (G') than points F'" or E'" so that point G'" will be illuminated stronger than points F'" or E'" to compensate the stronger light strength from position G'. Accordingly, the different light strengths are respectively properly compensated to obtain a pixel output for the photoelectric converting module as shown in FIG. 10. In this embodiment, column lens 14 has different curvatures in different crosssections (e, f, g) and the curvature in two ends thereof (e) is smaller than that in the intermediate portion thereof (g). Contrary to the first embodiment, in this embodiment, focus line fl2 is positioned at the inner side of scanned line sl2.

Figure 15A:
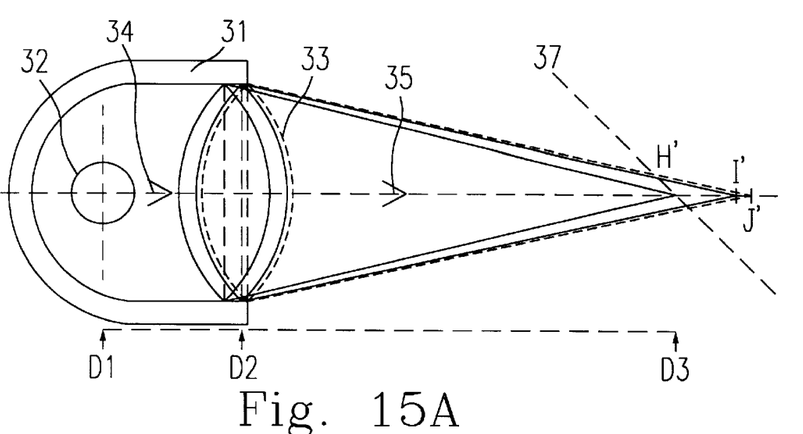
FIG. 15A is a schematical end view showing a third preferred embodiment of a device for equalizing the light strength of the light source according to the present invention.
Figure 15B:
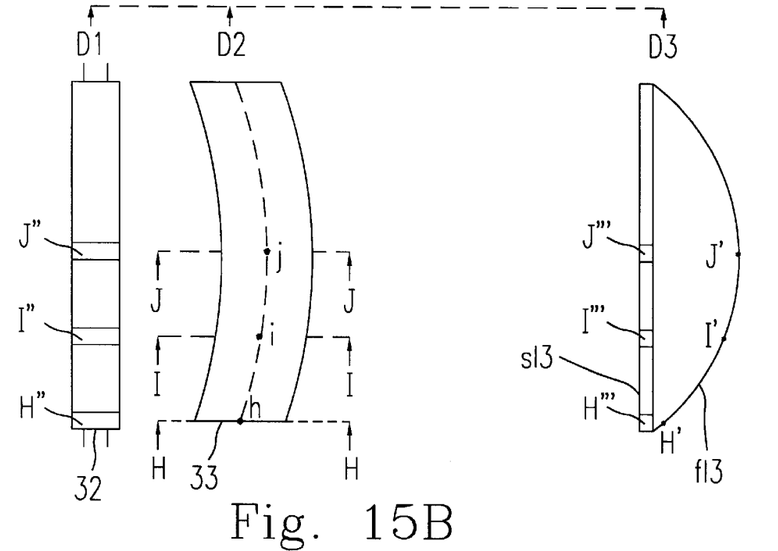
FIG. 15B is a schematical side view showing a device in FIG. 15A.
Figure 15C:
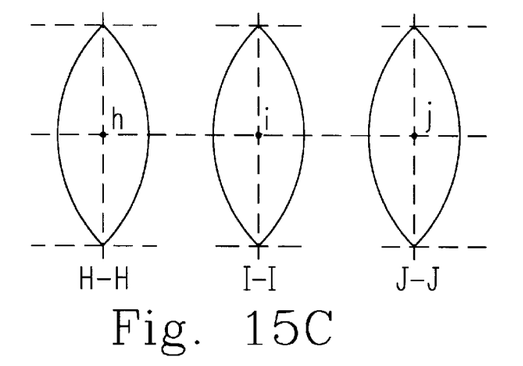
FIG. 15C is a schematical view showing 3 crosssections of a compensating device in an equalizing device in FIG. 15A.

Referring now to FIGS. 15A~15C, there is schematically shown an end view showing a third preferred embodiment of a device for equalizing the light strength of the light source 32 according to the present invention, in which FIG. 15B is a schematical side view showing a device in FIG. 15A from the direction shown by arrows D1, D2 and D3, and FIG. 15C is a schematical view showing 3 crosssections of a compensating device 33 in an equalizing device in FIG. 15A respectively from lines H—H, I—I and J—J. The device in this embodiment includes a light cover 31, a light source 32, a compensating device 33 mounted in the light path 35 and being a column lens having a focus line fl3 and a scanned object 37 having scanned line sl3.

Lamp tube 32 emits from different positions H", I", J" thereof a light 34 having different light strengths. Column lens 33 has in different corresponding crosssections h, i, j different focussing distances (or foci H', I', J'). Foci H', I', J' can be connected to form focus line fl3. canned line sl3 has points H'", I'", J'" respectively corresponding to different positions H", I", J" or foci H', I', J'. As can be clearly seen from FIG. 15B, point H'" is closer to the focus (H') than points I'" or J'" so that point H'" will be illuminated stronger than points I'" or J'" to compensate the weaker light strength from position H". By the same token, point J'" is farther to the focus (J') than points I'" or H'" so that point J'" will be illuminated stronger than points I'" or H'" to compensate the stronger light strength from position J". Accordingly, the different light strengths are respectively properly compensated to obtain a pixel output for the photoelectric converting module as shown in FIG. 10. In this embodiment, column lens 33 has substantially the same curvature in different crosssections (h, i, j). Like the first embodiment, focus line fl3 is positioned at the outer side of scanned line sl3 so that the distance between the either end (h) and scanned line sl3 (or the illuminated area) is smaller than the distance between the intermediate portion (j) and scanned line sl3 (or the illuminated area).

Figure 16A:
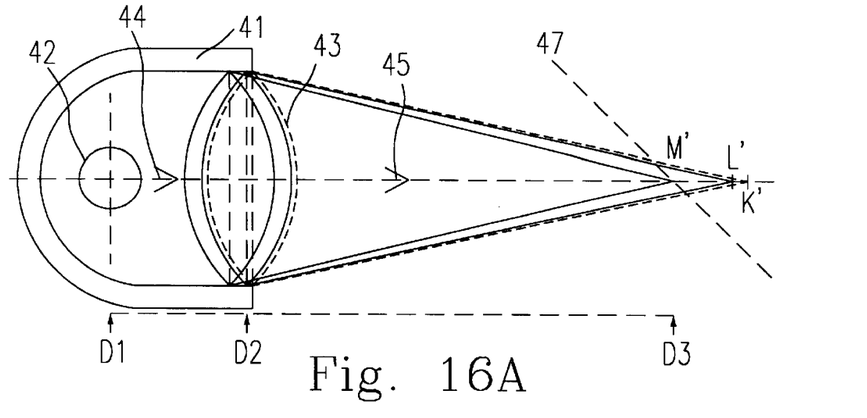
FIG. 16A is a schematical end view showing a fourth preferred embodiment of a device for equalizing the light strength of the light source according to the present invention.
Figure 16B:
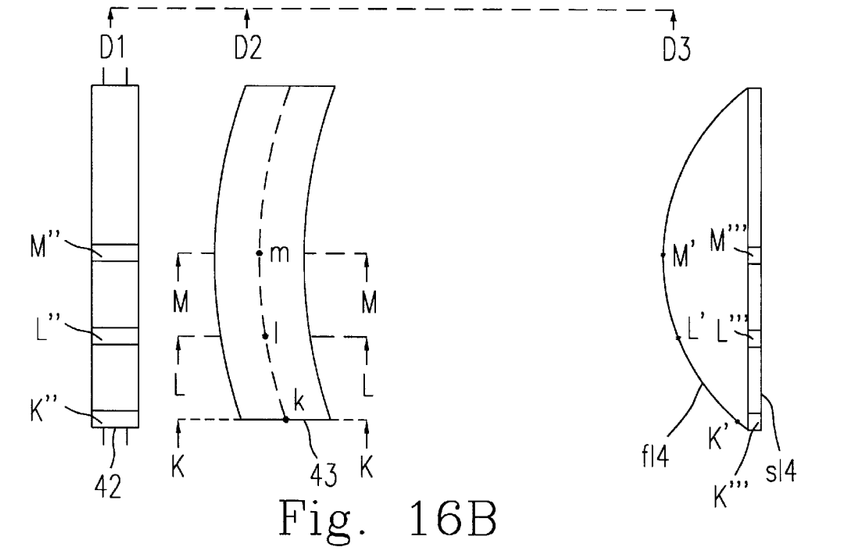
FIG. 16B is a schematical side view showing a device in FIG. 16A.
Figure 16C:
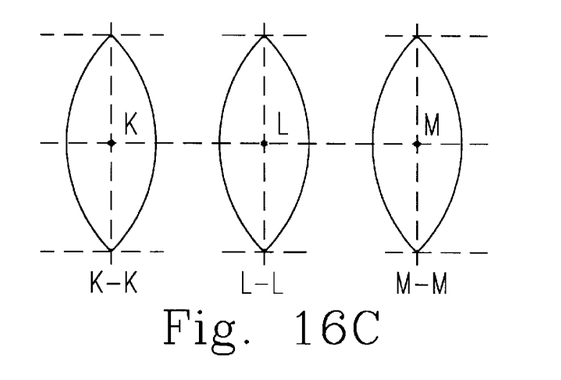
FIG. 16C is a schematical view showing 3 crosssections of a compensating device in an equalizing device in FIG. 16A.

Referring now to FIGS. 16A~16C, there is schematically shown an end view showing a third preferred embodiment of a device for equalizing the light strength of the light source 42 according to the present invention, in which FIG. 16B is a schematical side view showing a device in FIG. 16A from the direction shown by arrows D1, D2 and D3, and FIG. 16C is a schematical view showing 3 crosssections of a compensating device 43 in an equalizing device in FIG. 16A respectively from lines K—K, L—L and M—M. The device in this embodiment includes a light cover 41, a light source 42, a compensating device 43 mounted in the light path 45 and being a column lens having a focus line fl4 and a scanned object 47 having scanned line sl4.

Lamp tube 42 emits from different positions K", L", M" thereof a light 44 having different light strengths. Column lens 43 has in different corresponding crosssections k, l, m different focussing distances (or foci K', L', M'). Foci K', L', M' can be connected to form focus line fl4. Scanned line sl4 has points K'", L'", M'" respectively corresponding to different positions K", L", M" or foci K', L', M'. As can be clearly seen from FIG. 16B, point K'" is closer to the focus (K') than points L'" or M'" so that point K'" will be illuminated stronger than points L'" or M'" to compensate the weaker light strength from position K". By the same token, point M''' is farther to the focus (M') than points L''' or K''' so that point M''' will be illuminated stronger than points L''' or K''' to compensate the stronger light strength from position M''. Accordingly, the different light strengths are respectively properly compensated to obtain a pixel output for the photoelectric converting module as shown in FIG. 10. In this embodiment, column lens 43 has substantially the same curvature in different crosssections (k, l, m). Contrary to the third embodiment, focus line fl4 is positioned at the inner side of scanned line sl4 so that the distance between the either end (k) and scanned line sl4 (or the illuminated area) is larger than the distance between the intermediate portion (m) and scanned line sl4 (or the illuminated area).

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures. Therefore, the above description and illustration should not be taken as limiting the scope of the present invention which is defined by the appended claims.

What we claim is:

1. A device for equalizing the light strength of a light source comprising:
   an illuminated area;
   a light source emitting light for illuminating along a light path said illuminated area with different light strengths; and
   a compensating device mounted in said light path for respectively compensating said different light strengths in order to equalize said different light strengths on said illuminated area, wherein said compensating device is a focussing device having different foci in different cross-sections so that said different light strengths are equalized on said illuminated area.

2. A device according to claim 1 wherein said focussing device is a column lens having different curvatures in different cross-sections.

3. A device according to claim 2 wherein said focussing device is elongate and has two ends and an intermediate portion in which said curvature in said two ends is larger than that in said intermediate portion.

4. A device according to claim 2 wherein said focussing device is elongate and has two ends and an intermediate portion in which said curvature in said two ends is smaller than that in said intermediate portion.

5. A device according to claim 1 wherein said focussing device is a column lens having substantially the same curvature in different cross-sections.

6. A device according to claim 5 wherein said focussing device is elongate and has two ends and an intermediate portion in which the distance between said either end and said illuminated area is larger than the distance between said intermediate portion and said illuminated area.

7. A device according to claim 5 wherein said focussing device is elongate and has two ends and an intermediate portion in which the distance between said either end and said illuminated area is smaller than the distance between said intermediate portion and said illuminated area.

8. A device according to claim 1 wherein said light source is an elongate lamp.

9. A device according to claim 8, further comprising a lamp cover positioned at a first side of said lamp for directing said light toward a second opposite side of said lamp for enhancing said light strengths.

10. A device according to claim 9 wherein said lamp cover is provided with an inner reflection piece for reinforcing said light strengths.

11. A device according to claim 9 wherein said lamp cover has a crosssection being one of a ¾ circle and a parabola.

12. A scanner incorporating therein a device for equalizing the light strength of a light source comprising:
    an illuminated area;
    a light source emitting light for illuminating along a light path said illuminated area with different light strengths;
    a compensating device mounted in said light path for respectively compensating said different light strengths in order to equalize said different light strengths on said illuminated area, wherein said compensating device is a focussing device having different foci in different cross-sections so that said different light strengths are equalized on said illuminated area; and
    a scanned object disposed on said illuminated area to be scanned by said scanner.

13. A scanner according to claim 12 wherein said light source is an elongate lamp.

14. A scanner according to claim 13 wherein said focussing device is a column lens having different curvatures in different crosssections.

15. A device according to claim 13 wherein said focussing device is a column lens having substantially the same curvature in different crosssections.

16. A device for enhancing the light strength of a light source comprising:
    an illuminated area;
    a light source emitting light for illuminated along a light path said illuminated area with a light strength; and
    a light cover positioned at a first side of said light source for directing said light toward a second opposite side of said light source for enhancing said light strength, in which the improvement resides in that said light cover has a cross-section being one of a ¾ circle and a parabola, wherein said light strength is different all over said illuminated area.

17. A device according to claim 16, further comprising an compensating device mounted in said light path for compensating said light strength in order to equalize said light strength on said illuminated area.

18. A device according to claim 16 wherein said light cover is provided with an inner reflection piece for reinforcing said light strength.

* * * * *